Oct. 4, 1966                    K. OEPEN ET AL                          3,276,163
           APPARATUS FOR FORCING THE GROWTH OF PLANTS FOR HUMAN AND
             ANIMAL NOURISHMENT, WHEREBY SEEDS, BULBS AND PLANTS ARE
                CAUSED TO GROW BY FEEDING WITH CHEMICAL SOLUTIONS
Filed Oct. 7, 1963                                              2 Sheets-Sheet 1
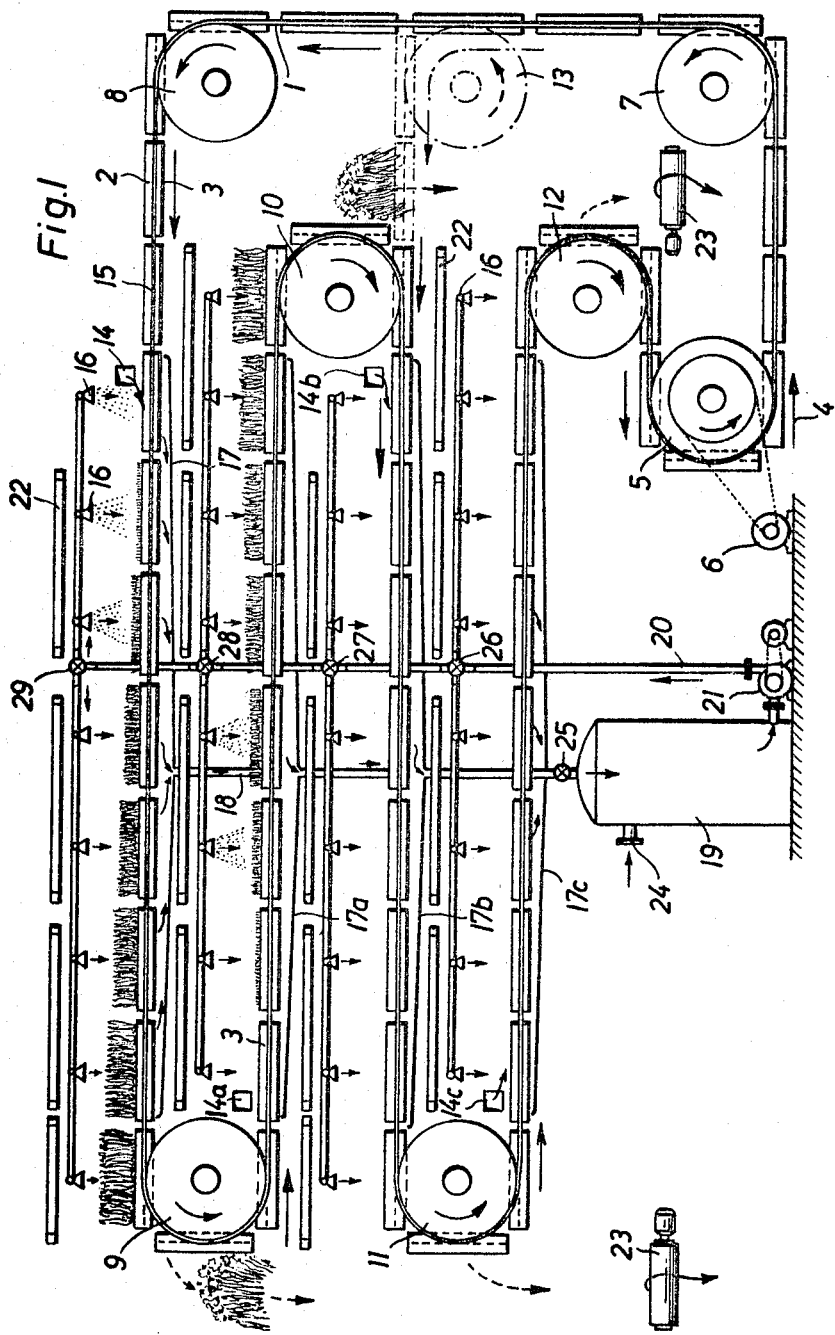

Oct. 4, 1966  K. OEPEN ET AL  3,276,163
APPARATUS FOR FORCING THE GROWTH OF PLANTS FOR HUMAN AND
ANIMAL NOURISHMENT, WHEREBY SEEDS, BULBS AND PLANTS ARE
CAUSED TO GROW BY FEEDING WITH CHEMICAL SOLUTIONS
Filed Oct. 7, 1963  2 Sheets-Sheet 2
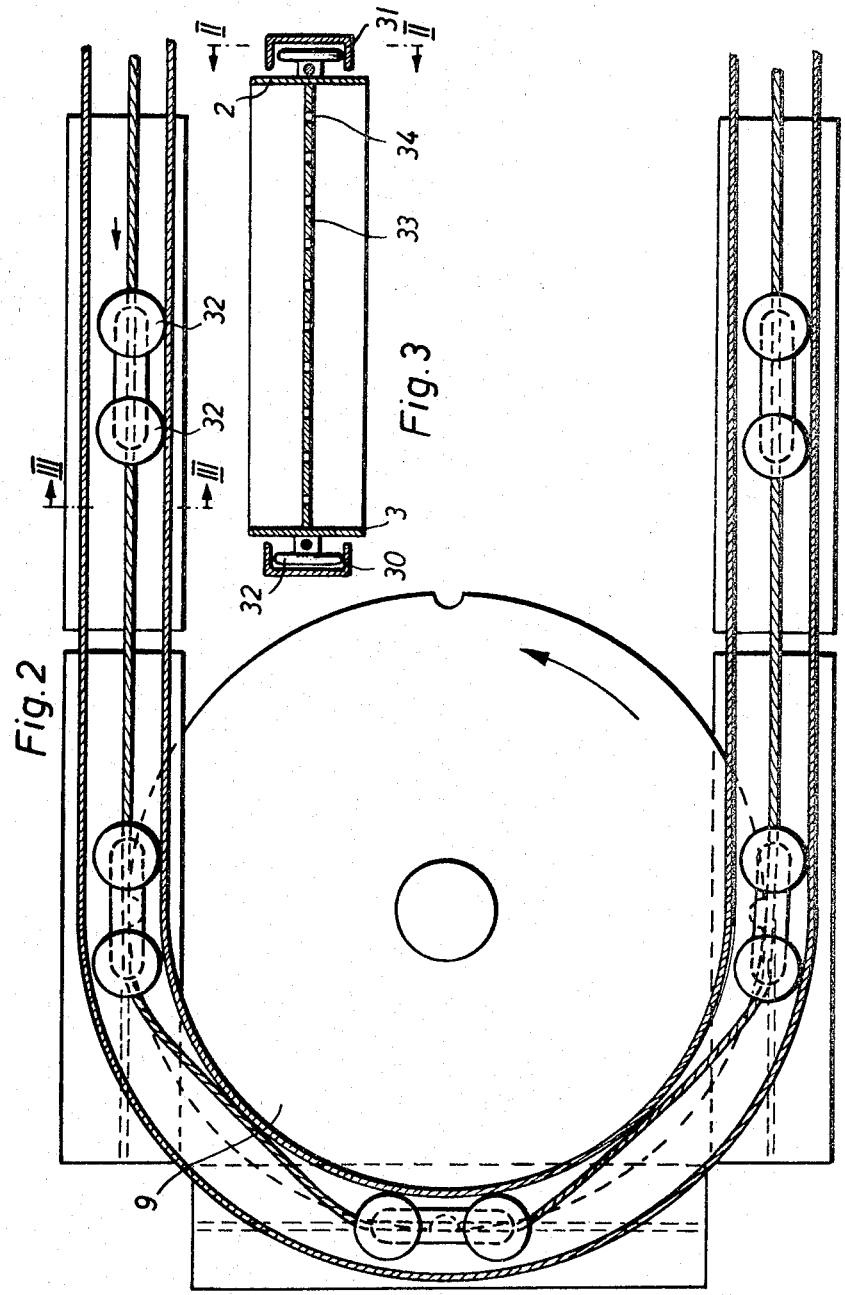

3,276,163
APPARATUS FOR FORCING THE GROWTH OF PLANTS FOR HUMAN AND ANIMAL NOURISHMENT, WHEREBY SEEDS, BULBS AND PLANTS ARE CAUSED TO GROW BY FEEDING WITH CHEMICAL SOLUTIONS
Karl Oepen, Gladbacherstrasse 28, Cologne, Germany, and Eugenio Pablo Geza Harsanyi, 2158 Calle Monroe, Buenos Aires, Argentina
Filed Oct. 7, 1963, Ser. No. 314,102
5 Claims. (Cl. 47—1.2)

The invention relates to a method and apparatus for cultivating plants for human and animal consumption wherein seeds, bulbs and plants are caused to grow by adding chemical solutions.

It is already known to cultivate plants in chemical solutions whereby the plants or even seeds or bulbs are planted in sand or other inert substances in stationary and very strong troughs or pans and sprayed with chemical solutions in order to force the growth. It is also customary in greenhouses to arrange pans for cultivating plants in stands or racks, whereby the planting and spraying with chemical solutions is carried out by hand. All of these known methods and apparatus are inconvenient because the stationary troughs or pans require a great deal of manual work to take care of and the forcing of growth is likewise unsatisfactory because the necessary steps to be effected or controlled by hand cannot be performed at the desired regular intervals and especially at night. The known installations also require a very great amount of space in proportion to results obtained so that in heated greenhouses a high consumption of energy in proportion to the field is necessary, which makes the cultivation of plants in trays uneconomical and does not allow employment on a large technical scale for monetary reasons. As a result, the former methods and apparatus are suitable only for growing spices and nursery or decorative plants which can be sold at a correspondingly high price.

The object of the invention is to devise a method and apparatus for growing plants for human and animal consumption, which can be used on a large technical scale for producing for example fodder in an economical manner so that animals consuming a large quantity can be fed with fresh food continuously without being dependent on pastures and land suitable for growing or obtaining fodder. Moreover, sufficient food can always be ensured even in periods of drought. The invention likewise enable animals to be kept for meat, milk or like purposes in districts which hitherto made this impossible, at least on a large scale, because the conditions necessary for growing fodder did not exist.

To attain this object, it is proposed according to the invention, for growing plants for human and animal consumption from seeds, bulbs or seedlings or cuttings by subjecting them to chemical solutions, that the seeds or the like be placed by a dosing arrangement on a conveyor system without being embedded in soil or the like, and the conveyor system be moved forward continuously or intermittently, with the length of the conveyor system or the speed of the continuous or intermittent travel being so adjusted that, when the desired growth is reached, the plants are automatically removed from the conveyor system, the arrangement being such that it is enclosed in a space which is automatically maintained at a temperature and degree of humidity necessary for obtaining maximum growth.

The space surrounding the conveyor system may be a hall, a room or a sheet-metal housing which is insulated with suitable material in order to maintain the temperature for most favorable growth in the closed space. Doors are also provided to afford access to the conveyor system and the latter may be constructed in various ways so as to ensure continuous or intermittent transport of the seeds and the plants which germinate therefrom in the course of time. Thus it can also be constructed as an inclined conveying means which carries the seeds and the growing plants into different zones in circulation, in order, when the desired state of growth is reached by constant treatment during the period of travel, to then eject the plants from the conveyor system, or to carry them through different stages of treatment, with the individual treatment zones, starting from the seeds or the actual state of the already germinated plants, being best adapted for furthering the growth. For example, one treatment zone may establish the most favorable conditions as regards temperature, humidity and chemical additives for the germination of the seeds, while a following treatment zone meets the requirements for furthering the growth of the germinated seed, and this is followed by one or more zones providing conditions most favorable for developing and maturing the growing plants. It is also important that the seeds and/or the plants are carried along at such time intervals that maximum growth takes place along a given path and that on reaching this latter stage the plants are removed from the conveyor system and used for fodder or carried away for further treatment.

The supply of the chemical solutions to the seeds, bulbs or plants carried by the conveyor system is preferably effected by a spraying plant, and it is advisable that the seeds, bulbs or plants on the conveyor system be subjected to radiation furthering the growth, the sources supplying the radiation can at the same time effect the heating of the space and are adapted to the best growing conditions in the individual zones.

The placing of seeds on a conveyor system without embedding the seeds in sand or some similar material can be put into effect because the roots of the seed intertwine and as a result form a root mat. The short period of time required by the present method for developing the plants from the germination of the seed to the growing of plants to the desired stage, enables the roots to be also used as a valuable foodstuff or fodder because such roots are not dried or lignified and consequently constitute a fresh food or fodder.

The plants cultivated in the manner of the invention as fresh, high-grade fodder can also be added to the known fodders for feeding animals, such as for example to fodder or feed cakes, hay, straw or similar, generally dry feeding stuffs, namely, the waste products from breweries, which are used for feeding animals.

A particularly advantageous apparatus for carrying out the present method comprises a chain or belt conveyor running over guide pulleys provided with horizontal axes and carrying shallow trays or pans arranged in tandem for receiving the seeds, grain or bulbs, with the trays preferably being in the form of shallow boxes having an apertured bottom wall. The trays may be produced from conventional materials and fixed on the conveyor chains so that on reaching a reversing pulley, the trays throw or discharge the grown plants onto a conveying system which carries such plants to a feeding zone or storage silo.

The trays or boxes are of plastic material in the form of reversible trays arranged on a conveyor belt in such a manner that the upper half of each tray can be used during movement of the upper flight of the conveyor and the lower half during movement of the lower flight whereby the assemblage requires a small amount of space and constructional cost.

According to another aspect of the invention, several circulating conveyors can be arranged one above the other but it is particularly advantageous to use a single conveyor moving at several levels in a substantially zig-zag path. More specifically, the conveyor is driven by a sprocket wheel or driving pulley, then guided upwards by a guide pulley following the driving pulley in the direction of the conveyor movement, about a second guide pulley spaced a distance above the first guide pulley into a horizontal plane, about a third guide pulley which reverses the direction of travel so that the conveyor runs in the opposite direction in a lower horizontal plane to a fourth guide pulley from which the conveyor runs back about the driving pulley, and if desired, the conveyor may be deflected to run along additional horizontal paths by further guide pulleys prior to reaching the driving pulley. As the conveyor is fitted with reversible trays and devices for filling the trays with seeds or the like are provided at the beginning of each horizontal path, the trays on one flight will be filled when the belt is running in one direction and those on the other flight when the belt is running in the other direction, with the grown plants being discharged from the trays at the end of each horizontal path as the trays run over the reversing pulleys, and carried to the place where the plants are required by belt or other conveying means provided under the reversing pulleys. A spraying system is installed above each of the horizontal paths of the belt and provided with spraying heads or nozzles preferably arranged in tandem a distance apart corresponding to the spacing of the trays, while a trough is located below each horizontal path for catching the surplus nutrient liquid and each trough has an outlet leading to a storage tank from which the spraying system is fed. According to a further aspect, a source of radiation is also arranged above each of the horizontal paths for furthering the germination of the seeds and growth of the plants as they move along these paths. Thus, a very compact apparatus is provided which requires but little driving and transmission energy and as the conveyor very often moves forward only the distance of one tray each day, the driving power required is very slight.

An embodiment of the invention is hereinafter described with reference to the accompanying drawings, in which:

FIG. 1 is an elevational view of a preferred from of the invention;

FIG. 2 is a view partly in section and partly in elevation of a portion of a conveyor composed of rubber with guide pulley and reversible trays mounted on the conveyor; and FIG. 3 is a section taken on line III—III of FIG. 2, the view looking in the direction of the arrows.

According to FIG. 1, reversible trays denoted generally T are mounted on a conveyor belt 1 although conveyor chains may be used. Each tray T includes an upper half 2 and a lower half 3. The conveyor moves in the direction of the arrow 4 and is driven by an electric motor 6 through a driving pulley 5. After leaving the driving pulley 5, the belt first moves about pulley 7 following the driving pulley and is thereby deflected upwards to a pulley 8 which guides the belt into a horizontal plane leading to a pulley 9 spaced from the pulley 8 and about which the belt passes into a lower horizontal plane leading to a pulley 10 spaced from the pulley 9, thereby reversing the direction of travel. The belt 1 then runs from the pulley 10 along a third horizontal path to pulley 11 where the belt is again turned through 180° into a fourth horizontal path leading to a pulley 12 from which the belt returns to the driving pulley 5, thereby providing a closed path of movement. It is possible to shorten the path of travel of the belt as indicated in FIG. 1, by arranging a pulley 13 between the pulleys 7 and 8 from which the belt then passes directly to the pulley 11. In this case the belt must be shortened and this can be effected by disengaging a coupling between the trays and reconnecting it between two of the other trays on the belt.

Seeds are poured into the upper halves 2 on the upper flight of the belt via a feed channel 14. Manifestly, the seeds or the like are delivered into the lower halves 3 on the lower flight of the belt by another channel 14a at the beginning of the horizontal path between the pulleys 9 and 10. As shown in FIG. 1 additional feed channels 14b and 14c are also provided for feeding the tray halves running along the horizontal paths between the pulleys 10, 11 and 11, 12 respectively. The halves 2 and 3 are separated by a bottom 15 in the form of a sieve, and the mesh size or diameter of the perforations selected is so chosen that the seed grains cannot fall therethrough. The object of these apertures in the bottoms 15 is to allow the chemical solutions supplied to the seeds by spraying nozzles 16 for germinating the seeds and furthering the growth of the plants, but not absorbed by the seeds or plants, to pass through the bottoms of the trays into a trough 17 extending the entire length of each horizontal path of the belt 1. Each of these troughs is provided with an outlet 18 leading to a storage tank 19 and the troughs under the lower horizontal paths of the belt are designated 17a, 17b and 17c respectively. The nutrient solution is fed from the storage tank 19 by a pump 21 through a pipeline 20 leading to the spraying nozzles 16 which are arranged above each of the horizontal paths of the conveyor belt 1 a distance apart corresponding to the distance between the individual trays so that a nozzle is located exactly centrally above each of the trays. Furthermore, sources of radiation 22 are also arranged above each of the horizontal paths of the belt and can also be used as sources of heat. In the example illustrated fluorescent lamps are provided which are arranged in tandem along a line following the direction of travel of the belt.

The apparatus illustrated in FIG. 1 operates in the following manner:

The seeds are fed into the trays through the channels 14 and the spray heads are activated according to the temperature established in the space surrounding the apparatus. At the end of one day, the belt 1 is moved forward a distance corresponding to the length of one tray and seeds are fed into the next following tray. The seeds already treated during the first day have in the meantime germinated and developed roots which tangle together and form a mat. At the end of the second day the belt is again moved a distance corresponding to the length of a tray and seeds are fed into the next tray. According to the embodiment illustrated in FIG. 1, the growth of the plants at the end of seven days has progressed so far that the plants are ready to be used as fodder or for further treatment. By then the tray first filled with seed will have reached the end of its horizontal path of travel and will run about the pulley 9 whereby the mature plants will be discharged from the upper half 2 onto a conveyor 23. The mature plants are also discharged from the trays reaching the ends of the lower horizontal paths and run over the pulleys 10, 11 and 12, so that the delivery of mature plants take place four points simultaneously thereby greatly increasing the capacity of the installation. It is obvious that the belt need not be moved only the length of tray each day but that it can be shifted in shorter or longer intervals because the rhythm of the intermittent movement of the belt can be adapted to the growth conditions of the plants as regards the temperature in the surrounding space and the kind of chemical used as fertilizer or nutrient. The control is effected by a programme switch so that the apparatus operates automatically with a minimum amount of supervision or service.

It is also possible to provide not only a single storage tank 19 for the fertilizers or chemicals but several such tanks may be used for enabling different chemicals to be provided in the different stages of growth from the seeds to the mature plants. Furthermore, it is also possible to apply different kinds of radiation or the same kind of radiation with different intensities in the different stages of growth of the plants. Fresh chemical solution can be supplied to the tank 19 through a pipeline 24 and the supply to the spraying devices 16 can be controlled by valves 25, 26, 27, 28 which can be electromagnetically controlled in order to enable the dosing of the chemical solution, which may be different for the individual spraying devices 16.

FIG. 3 is a cross-section through the belt conveyor 1 moving about the guide pulley 9 as shown in FIG. 2 and is supported by rollers 32 and carries the trays which are mounted on the belt 1 in such a manner that the open ends of the upper halves 2 are uppermost when the belt is moving on to the pulley 9 and the open ends of the lower halves 3 are uppermost when the belt moves off the pulley. As the belt moves about the pulley 9 the plants whose roots are entangled and form a mat drop out of the upper halves 2 automatically, and this action can be facilitated by making the walls of the trays so that they widen in outward direction. In FIG. 2 it will be noted that two pairs of wheels 32 are coordinated to each tray T.

The bottom 33 of each tray is provided with a plurality of perforations 34 and the bottom is common to the upper and lower halves 2 and 3, respectively.

The invention is not to be confined to any strict conformity to the showings in the drawings and changes or modifications may be made thereto as long as such changes or modifications mark no material departure from the spirit and scope of the appended claims.

We claim:
1. An apparatus for growing plants for human and animal consumption from seeds, bulbs and the like with the assistance of chemical solutions, comprising a single conveyor belt, reversible trays mounted on said conveyor belt, a pulley arrangement operably related to said belt for moving said belt and trays in at least two different horizontal planes, said pulley arrangement including a drive pulley, a first guide pulley spaced from said driving pulley in the direction of movement of the belt, a second guide pulley spaced above the first guide pulley, a third guide pulley spaced from said second guide pulley in the direction of movement of the belt and cooperable with said second pulley for constituting a first horizontal plane, a fourth guide pulley mounted below said third guide pulley and spaced therefrom in the direction of movement of the belt and cooperable with said third guide pulley for constituting a lower horizontal plane, and said belt moving from said fourth guide pulley to said driving pulley thereby providing a closed path of movement, each of said reversible trays including an open ended upper half and an open ended lower half, means for introducing seeds into the upper half of the trays at the beginning of the horizontal plane between the second and third guide pulleys, further means for feeding the seeds into the lower half of the trays at the beginning of the horizontal plane between the third guide pulley and the fourth guide pulley, spraying means extending above each of said horizontal planes for spraying a chemical solution into said trays and including nozzles spaced to correspond to the distance between the centers of the trays, trough means located below each horizontal plane for receiving surplus chemical solution not absorbed by the growing plants, a storage tank for the chemical solution, a discharge leading from each trough means to said storage tank, means for suppling the chemical solution from the storage tank to said spraying means, further conveying means operably related to said third and fourth guide pulleys for receiving mature plants discharged from the trays when the trays move about such pulleys for transporting the mature plants to the desired location, and means constituting a closed space surrounding said apparatus for maintaining such apparatus at the desired temperature and degree of humidity.

2. The apparatus as claimed in claim 1 including a source of radiation located above each of said horizontal paths for radiating the growing plants as the trays move along such horizontal planes.

3. The apparatus as claimed in claim 2 in which said source of radiation comprises a plurality of fluorescent lamps arranged in tandem.

4. The apparatus as claimed in claim 1 including means for shortening the length the conveyor belt.

5. The apparatus as claimed in claim 1 in which each tray is provided with a perforated bottom common to said upper and lower halves constituting the tray for permitting surplus chemical solution to find egress from the tray.

References Cited by the Examiner

UNITED STATES PATENTS

| 951,286 | 3/1910 | Mueller. | |
| 1,793,626 | 2/1931 | McCormick | 47—17 |

FOREIGN PATENTS

| 163,369 | 6/1955 | Australia. |
| 502,668 | 3/1939 | Great Britain. |

ABRAHAM G. STONE, *Primary Examiner.*

R. E. BAGWILL, *Assistant Examiner.*